(12) United States Patent
Lee

(10) Patent No.: US 7,505,581 B2
(45) Date of Patent: Mar. 17, 2009

(54) FOLDER TYPE MOBILE TERMINAL

(75) Inventor: Choong-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 607 days.

(21) Appl. No.: 10/725,506

(22) Filed: Dec. 3, 2003

(65) Prior Publication Data

US 2004/0109559 A1 Jun. 10, 2004

(30) Foreign Application Priority Data

Dec. 6, 2002 (KR) .................. 10-2002-0077405
Dec. 6, 2002 (KR) .................. 10-2002-0077406
Dec. 6, 2002 (KR) .................. 10-2002-0077407

(51) Int. Cl.
*H04M 1/00* (2006.01)
*H04M 9/00* (2006.01)

(52) U.S. Cl. .................. 379/433.04; 379/433.13

(58) Field of Classification Search ............ 379/433.04, 379/433.12, 433.13, 441, 437, 451; 455/550.1, 455/575.1, 575.3, 575.4, 90.1, 90.3; 349/58–60; 362/561

See application file for complete search history.

(56) References Cited

U.S. PATENT DOCUMENTS

| | | | |
|---|---|---|---|
| 5,002,184 A | 3/1991 | Lloyd | |
| 5,150,231 A | 9/1992 | Iwamoto et al. | 349/60 |
| 5,689,824 A | 11/1997 | Nagai | |
| 5,804,780 A * | 9/1998 | Bartha | 200/5 A |
| 5,933,783 A | 8/1999 | Kawakami et al. | 455/566 |
| 6,011,699 A | 1/2000 | Murray et al. | |
| 6,064,453 A * | 5/2000 | Inubushi et al. | 349/58 |
| 6,148,080 A | 11/2000 | Collin | |
| 6,229,994 B1 | 5/2001 | Pavet | 455/90 |
| 6,904,300 B1 | 6/2005 | Maattanen et al. | |
| 6,957,083 B2 | 10/2005 | Ideka et al. | |
| 6,967,280 B1 | 11/2005 | Boatwright et al. | |
| 7,006,854 B2 * | 2/2006 | Choi | 455/575.3 |
| 2001/0049293 A1 | 12/2001 | Shimazaki | 455/550 |
| 2002/0128053 A1 | 9/2002 | Jung | 455/575 |
| 2003/0064638 A1 * | 4/2003 | Fuse et al. | 440/38 |

(Continued)

FOREIGN PATENT DOCUMENTS

CN 1233126 10/1999

(Continued)

OTHER PUBLICATIONS

Chinese Office Action dated Dec. 10, 2004.

(Continued)

*Primary Examiner*—Curtis Kuntz
*Assistant Examiner*—Phylesha Dabney
(74) *Attorney, Agent, or Firm*—Ked & Associates, LLP

(57) ABSTRACT

A mobile terminal having a folder configured for protection against damage to a display module, such as a liquid crystal display (LCD), due to an external impact is provided. Buffering members disposed in various positions between the display module and the upper cover of the folder are configured to absorb an impact generated due to an externally applied force, to prevent deformation of the upper cover, and to prevent subsequent damage to the display module. Additionally, a number of reinforcing mechanisms may be provided to enhance the strength of the upper and lower covers of the folder, making them less susceptible to deformation due to an externally applied force.

37 Claims, 8 Drawing Sheets

U.S. PATENT DOCUMENTS

| | | | |
|---|---|---|---|
| 2004/0038703 | A1 | 2/2004 | Noto et al. |
| 2004/0077385 | A1 | 4/2004 | Makino et al. |
| 2005/0141187 | A1* | 6/2005 | Shimizu .................... 361/683 |
| 2006/0110608 | A1* | 5/2006 | Azumi et al. ............... 428/441 |

FOREIGN PATENT DOCUMENTS

| | | |
|---|---|---|
| CN | 2414554 Y | 1/2001 |
| CN | 2447830 Y | 9/2001 |
| CN | 1375976 | 10/2002 |
| JP | 09-283950 | 10/1997 |
| JP | 2000-194268 | 7/2000 |
| JP | 2001345898 | 12/2001 |
| JP | 2004023610 | 1/2004 |
| KR | 1998-0057623 | 10/1998 |
| KR | 2001-0027039 | 4/2001 |
| KR | 2002-0066806 | 8/2002 |
| KR | 0038013/2002 | * 11/2002 |

OTHER PUBLICATIONS

Korean Office Action dated Oct. 16, 2004.
Korean Office Action dated Oct. 21, 2004.
Korean Office Action dated Oct. 27, 2004.
Chinese Office Action dated Nov. 12, 2004.

* cited by examiner

FOLDER TYPE MOBILE TERMINAL

BACKGROUND OF THE INVENTION

1. Field of the Invention

The invention relates to a mobile terminal, and more particularly, to a folder type mobile terminal.

2. Background of the Related Art

Folder type mobile terminals have become widely used due to a number of advantages associated with them. One such advantage is that a folder type mobile terminal can accommodate a large display, such as a liquid crystal display (LCD), making it easier to view information displayed to a user via the display. For example, newly developed dual display folder type mobile terminals which have a display mounted not only on an inner side of the folders, but also on an outer side thereof are becoming increasingly popular.

FIG. 1A is a schematic perspective view of a related art folder type mobile terminal. FIG. 1B is a schematic disassembled perspective view of a related art folder of a folder type mobile terminal. FIG. 2 is a schematic sectional view of the related art folder of FIGS. 1A and 1B.

A related art folder type mobile terminal as shown in FIG. 1A includes a main body 200, and a folder 100 rotatably attached to the main body 200. The related art folder of a mobile terminal as shown in FIG. 1B, includes an upper cover 102, which forms an outer surface of the terminal, and a lower cover 104, which engages with the upper cover 102. A hinge portion 116 connects the folder to a body of the terminal (not shown). An LCD module 106 is installed between the upper cover 102 and the lower cover 104, and has a sub LCD 108 at the front surface thereof, a main LCD (not shown) at the rear surface thereof, and a receiver 110 at one side thereof A transparent window 120 is provided in the upper cover 102 for viewing information displayed on a display portion 128 of the sub LCD 108. To minimize thickness of the folder, only the portion of the folder in which the transparent window 120 is installed protrudes from the folder.

That is, the upper cover 102 is provided with an opening portion 122 in order to view information displayed on the sub LCD 108 through the transparent window 120. A rib 124 for mounting the transparent window 120 is formed at an edge of the opening portion 122, and a protrusion portion 126 is formed at a periphery of the opening portion 122. A lower surface of the rib 124 and an upper surface of the sub LCD 108 maintain a constant gap in order to prevent the sub LCD 108 from being damaged by contact with the rib 124.

However, in the conventional art folder, because the area where the transparent window 120 of the upper cover 102 is attached protrudes, an external impact which may be applied when, for example, the terminal is dropped, will frequently be applied to the protrusion portion 126, causing the protrusion portion 126 to be deformed, and the sub LCD 108 to be damaged. More particularly, if, as shown in FIG. 3, an external force F1 is applied to an upper surface of the protrusion portion 126, the rib 124 where the transparent window 120 is mounted is bent downward. The rib 124 comes into contact with the upper surface of the sub LCD 108, thus damaging the sub LCD 108.

SUMMARY OF THE INVENTION

An object of the invention is to solve at least the above problems and/or disadvantages and to provide at least the advantages described hereinafter.

To achieve these and other advantages, in whole or in part, in accordance with an embodiment of the invention, as embodied and broadly described herein, there is provided a folder for a folder type mobile terminal according to an embodiment of the invention, comprising an upper cover, a lower cover configured to be attached to the upper cover, a display module disposed between the upper cover and the lower cover, the display module comprising at least a sub display and a main display, and a buffering member disposed between the upper cover and the sub display and configured to prevent an external force applied to the upper cover from being transmitted to the sub display.

To further achieve these and other advantages, in whole or in part, in accordance with an embodiment of the invention, as embodied and broadly described herein, there is provided a folder type mobile terminal according to an embodiment of the invention, comprising an upper cover, comprising a main body, and a folder configured to be rotatably attached to the main body, the folder comprising an upper cover, a lower cover configured to be attached to the upper cover, a display module disposed between the upper cover and the lower cover, the display module comprising at least a sub display and a main display, and a buffering member disposed between at least a portion of the upper cover and the sub display and configured to prevent an external force applied to the upper cover from being transmitted to the display module.

To further achieve these and other advantages, in whole or in part, in accordance with an embodiment of the invention, as embodied and broadly described herein, there is provided a folder type mobile terminal in accordance with an embodiment of the invention, comprising an upper cover engaged with the upper cover and; a lower cover engaged with the upper cover and rotatably coupled to a body of the mobile terminal; and a display module disposed between the upper cover and the lower cover comprising at least a main display and a sub display; wherein a reinforcing member configured to reinforce a strength of the upper cover is integrally adhered to the upper cover at the time of fabrication of said upper cover.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1A:
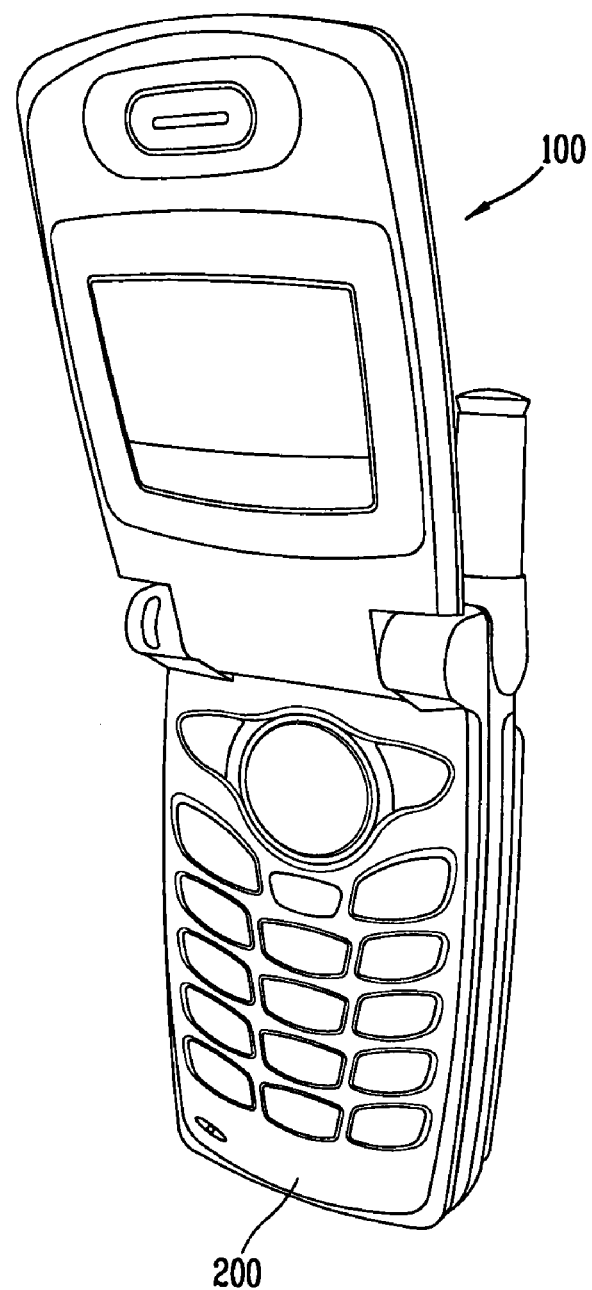
FIG. 1A is a schematic perspective view of a related art folder type mobile terminal.
Figure 1B:
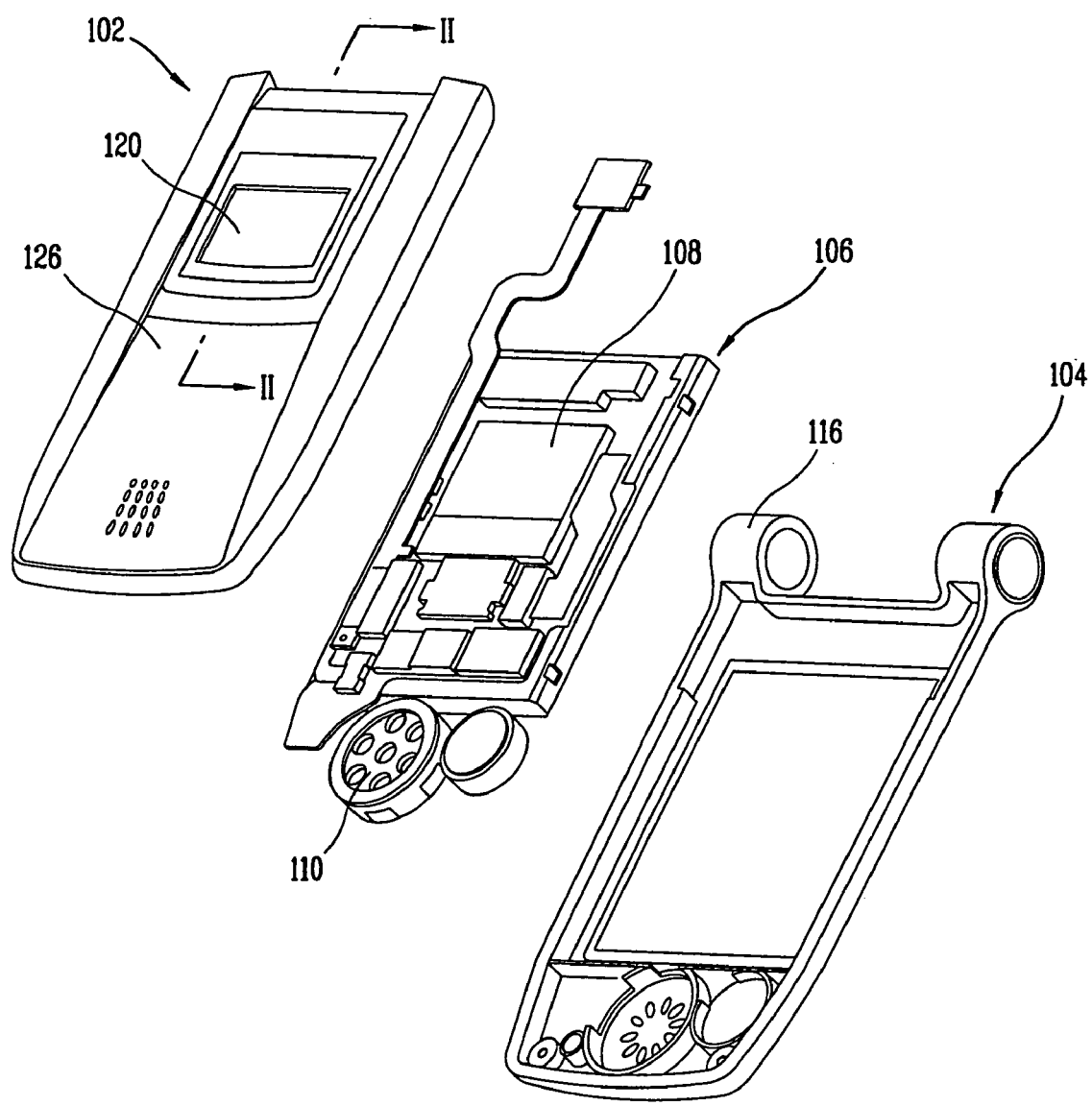
FIG. 1B is a schematic disassembled perspective view of a folder of a related art mobile terminal.
Figure 2:
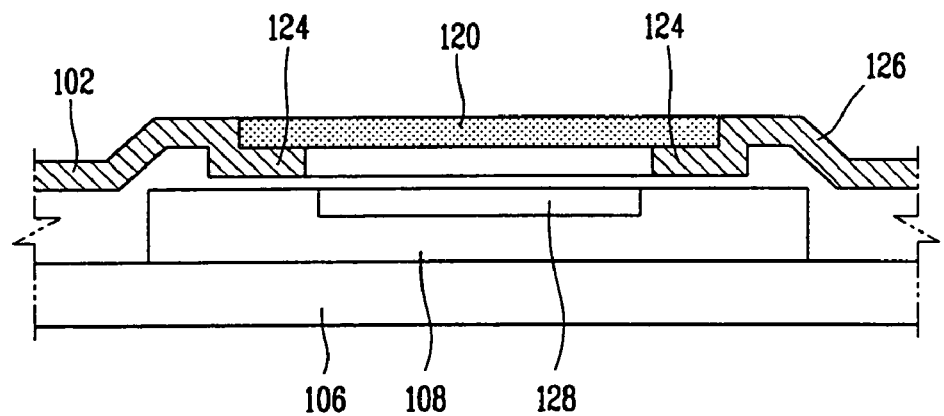
FIG. 2 is a schematic sectional view of the related art folder type mobile terminal of FIG. 1 with the folder engaged.
Figure 3:
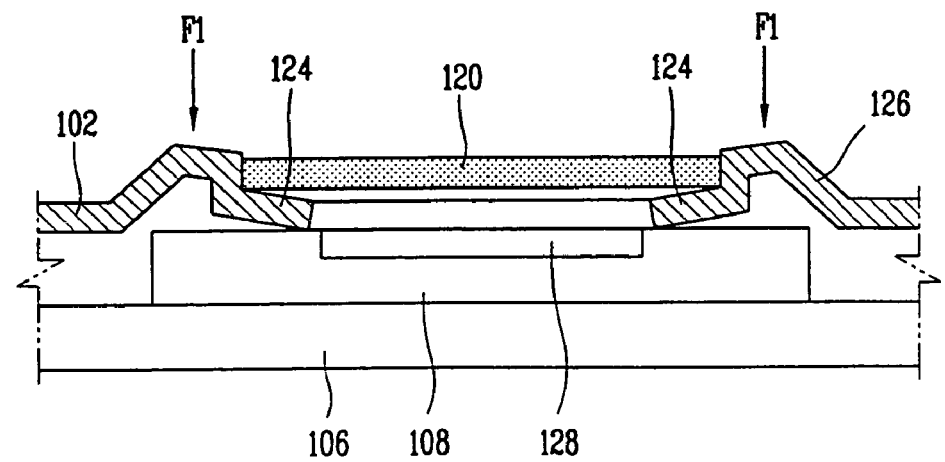
FIG. 3 is a schematic sectional view of the related art folder of FIG. 1, an upper cover of which has been deformed due to an impact applied thereto.
Figure 4:
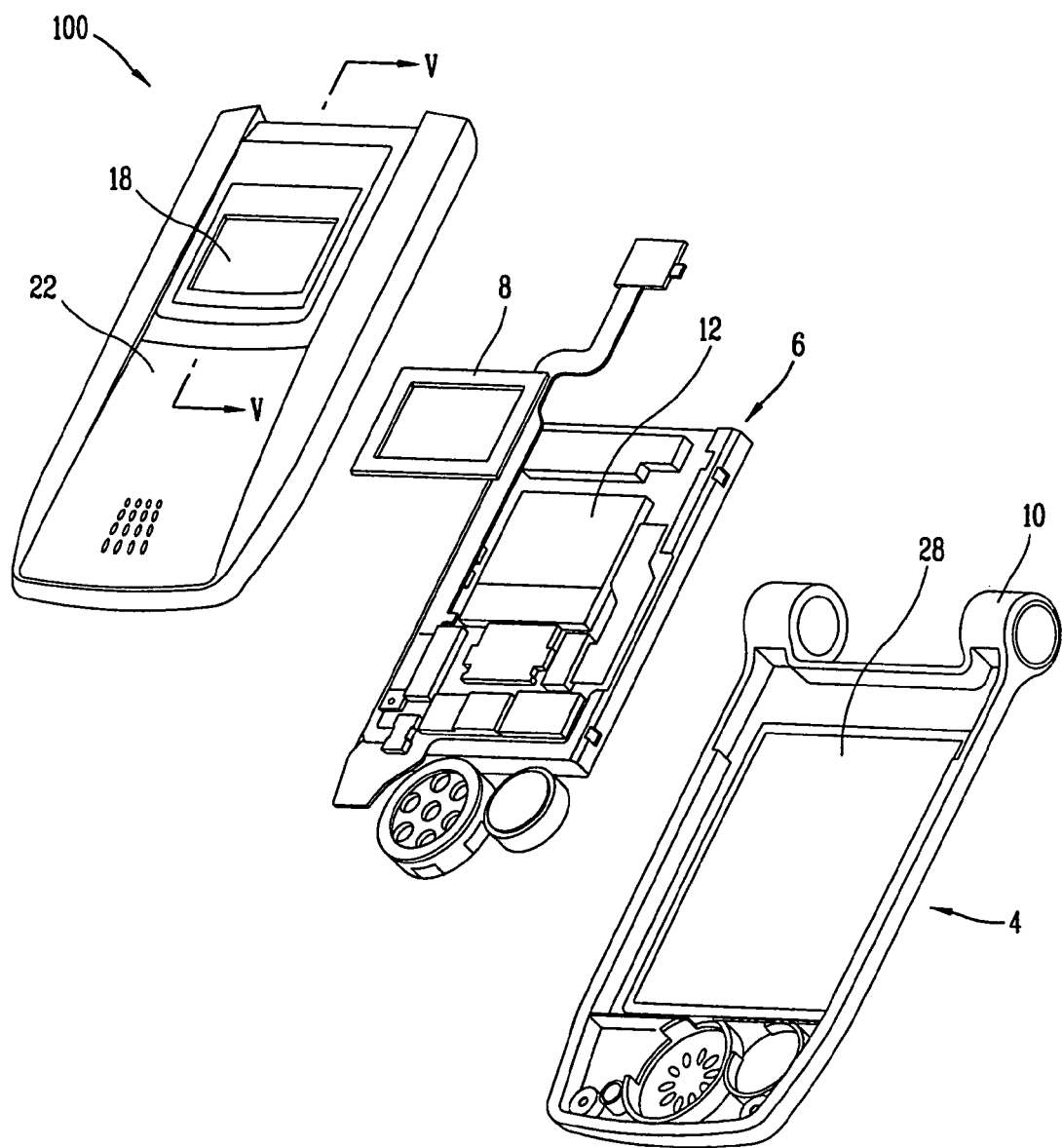
FIG. 4 is a schematic disassembled perspective view of a folder of a folder type mobile terminal in accordance with an embodiment of the invention.

FIG. 4 is a schematic disassembled perspective view of a folder of a folder type mobile terminal in accordance with an embodiment of the invention. The folder of FIG. 4 is configured to be rotatably attached to a main body of a folder type mobile terminal, such as main body 20 of FIG. 1. The folder 100 of FIG. 4 includes an upper cover 2 which forms an outer surface of the folder, and a lower cover 4 provided with a hinge portion 10 configured to rotatably connect the folder to a main body of a folder type mobile terminal, as discussed above. A display module 6 is provided between the upper cover 2 and the lower cover 4. The display module 6 has a sub display 12 at a front surface thereof and a main display (not shown) at a rear surface thereof. A buffering member 8 is provided between the upper cover 2 and the sub display 12 to prevent the sub display 12 from being damaged by an external impact applied to the upper cover 2. A transparent sub window 18 for viewing information displayed on a display portion 16 of the sub display 12 from outside is provided in the upper cover 2, and a transparent main window 28 for viewing information displayed on the main display is provided in the lower cover 4.

In order to minimize thickness of the folder 100, only the portion of the folder 100 in which the transparent window 18 is installed protrudes from the folder 100. That is, the upper cover 2 is provided with an opening portion 14 in order to view information displayed on the sub display 12 through the transparent window 18. Also, a rib 20 in which the transparent window 18 is mounted is formed at an edge of a lower surface of the opening portion 14, and a protrusion portion 22 which extends upward at a predetermined angle is formed at an outer periphery of the opening portion 14.

Figure 6:
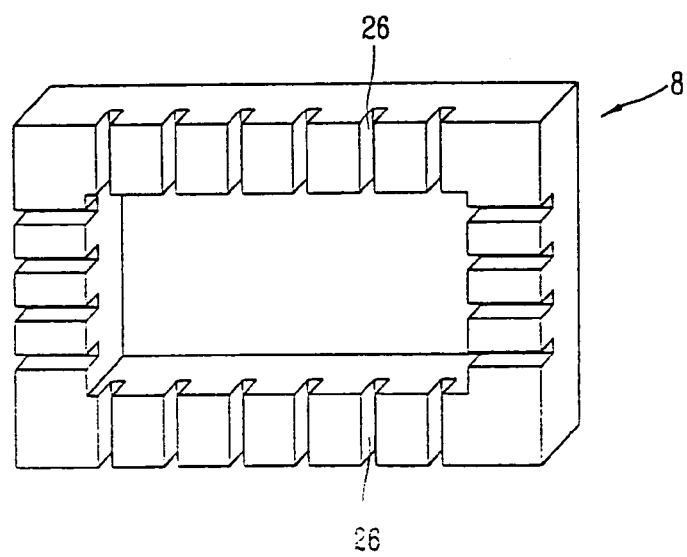
FIG. 6 is a schematic perspective view of a buffering member in accordance with an embodiment of the invention.

The buffering member 8 is mounted between a lower surface of the rib 20 and the upper surface of the sub display 12, thus preventing the rib 20 from being deformed when an external impact force F1 is applied to an upper surface of the protrusion portion 22, and minimizing any impact to the sub display 12. For example, as shown in FIG. 6, the buffering member 8 may be a plate type member of a predetermined thickness with an open center portion. The buffering member may include a plurality of vent holes 26 to prevent circuit components which may be attached to the display module 6 from being damaged by environmental effects, such as moisture.

The vent holes 26 may be grooves formed at predetermined intervals and of a predetermined depth along a surface of the buffering member 8 so as to connect an inside and an outside of the buffering member 8. The buffering member 8 may be formed of any material capable of easily absorbing an impact, such as, for example, a resin material or a rubber material of a given elasticity. The buffering member 8 may be attached to either the lower surface of the rib 20 or the upper surface of the display module 6 by a material, such as an adhesive.

Thus, if an external impact force F1 is applied on the protrusion portion 22 of the upper cover 2 due to, for example, the terminal being dropped, and the rib 20 is impacted, the buffering member 8 mounted between the rib 20 and the sub display 12 absorbs the impact, thereby preventing the rib 20 from being deformed and preventing the impact from being transmitted to the sub display 12. In this manner, damage to the display module 6 is prevented.

Figure 7:
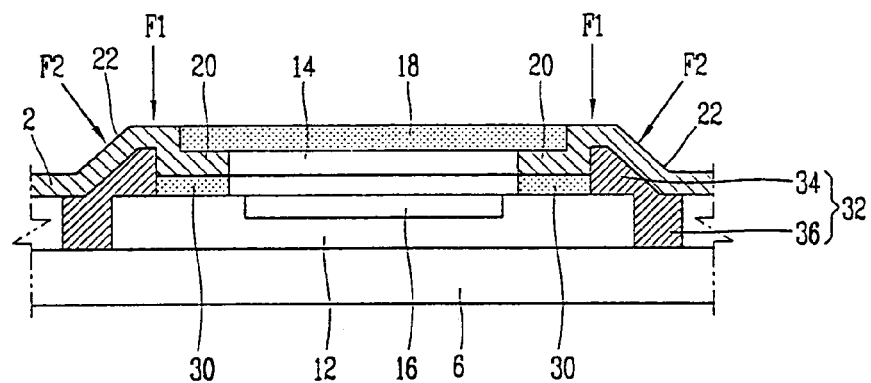
FIG. 7 is a schematic partial sectional view of a folder of a folder type mobile terminal in accordance with an embodiment of the invention.

A folder of a mobile terminal according to another embodiment of the invention is shown in FIG. 7. The folder of FIG. 7 is configured to be rotatably attached to a main body of a folder type mobile terminal, such as main body 20 of FIG. 1.

As shown in FIG. 7, a first buffering member 30 is mounted between the lower surface of the upper cover 2 and the upper surface of the sub display 12. The first buffering member 30 is configured to absorb an impact of a force F1 which is vertically applied to the upper cover 2. A second buffering member 32 is mounted between a side surface of the sub display 12 and a lower surface of the upper cover 2. The second buffering member 32 is configured to absorb an impact of a force F2 which is laterally applied to the upper cover 2.

Figure 5:
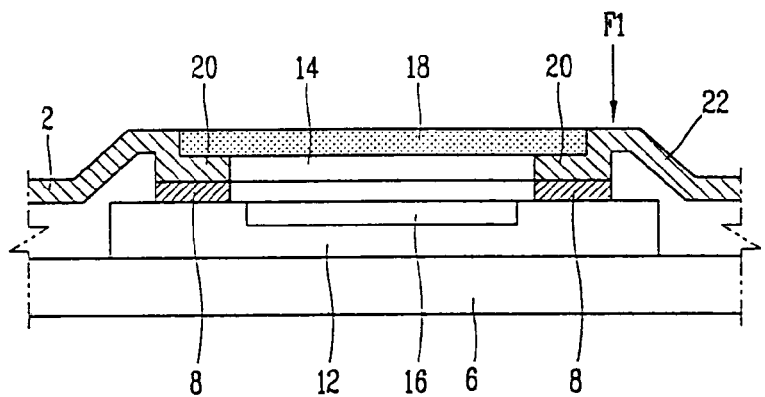
FIG. 5 is a schematic partial sectional view of the folder of FIG. 4.

The upper cover 2 of the embodiment shown in FIG. 7 has the same structure as the upper cover 2 previously discussed with respect to the embodiment of FIGS. 4-6. Further, the first buffering member 30 is mounted between the lower surface of the rib 20 and the upper surface of the sub display 12, and may have the same structure as the buffering member 8 previously discussed with respect to the embodiment of FIGS. 4-6.

The second buffering member 32 includes a first buffering portion 34 attached to an inner side of the protrusion portion 22, and a second buffering portion 36 extending from the first buffering portion 34 and contacting the upper surface of the display module 6. An upper surface of the first buffering portion 34 is bent at a predetermined angle so as to attach to an inner side of the protrusion portion 22, and also contacts an outer surface of the sub display 12. The second buffering portion 36 has a lower surface which contacts the upper surface of the display module 6 and a side surface which contacts another surface of the sub display 12. The second buffering member 32 can be formed of any material capable of easily absorbing an impact, such as, for example, a resin material or a rubber material of a given elasticity.

In the folder shown in FIG. 7, if an impact force F1 is vertically applied to the protrusion portion 22 of the upper cover 2, the impact is absorbed by the first buffering member 30, thus preventing damage to the sub display 12. Also, if an impact force F2 is laterally applied to the protrusion portion 22 of the upper cover 2, the impact is absorbed by the second buffering member 32, thus preventing damage to the display module 6.

Figure 8:
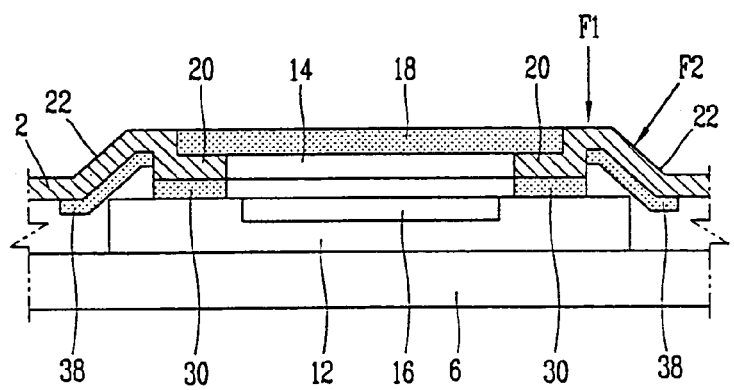
FIG. 8 is a schematic partial sectional view of a folder of a folder type mobile terminal in accordance with an embodiment of the invention.

A folder of a mobile terminal according to another embodiment of the invention is shown in FIG. 8. The folder of FIG. 8 is configured to be rotatably attached to a main body of a folder type mobile terminal, such as main body 20 of FIG. 1.

The folder shown in FIG. 8 has substantially the same structure as previously discussed with respect to the embodiments of FIGS. 4-6 and 7, except a second buffering member 38 is included. In this embodiment, the second buffering member 38 is a plate type member formed at a predetermined angle, and is attached to an inner surface of the protrusion portion 22 in a circumferential direction. The second buffering member 38 is preferably thin enough so that, when the upper surface thereof is attached to the inner surface of the protrusion portion 22, the lower surface thereof does not come into contact with the display module 6. If a force F2 is applied on the upper cover 2 in a lateral direction, the second buffering member 38 acts as a buffer and absorbs the impact of force the F2, thereby preventing subsequent damage to display module 6 due to deformation of the protrusion portion 22.

Figure 9:
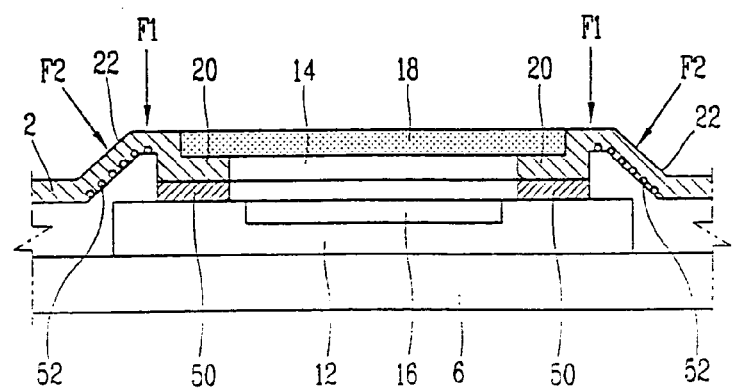
FIG. 9 is a schematic partial sectional view of a folder of a folder type mobile terminal in accordance with an embodiment of the invention.

A folder of a mobile terminal according to another embodiment of the invention is shown in FIG. 9. The folder of FIG. 9 is configured to be rotatably attached to a main body of a folder type mobile terminal, such as main body 20 of FIG. 1. The folder shown in FIG. 9 has substantially the same structure as those previously discussed with respect to the embodiments of FIGS. 4-6, 7, and 8. However, the folder of FIG. 9 includes a reinforcing member 52 disposed at an inner surface of the upper cover 2, for reinforcing strength of the upper cover 2. The reinforcing member 52 is integrally formed at the inner side of the protrusion portion 22. A buffering member 50 for absorbing an external impact, such as a force F1, is disposed between the lower surface of the rib 20 and the upper surface of the sub display 12. The buffering member 50 is the same as buffering member 8 previously discussed, and therefore a detailed explanation is omitted.

Figure 10:
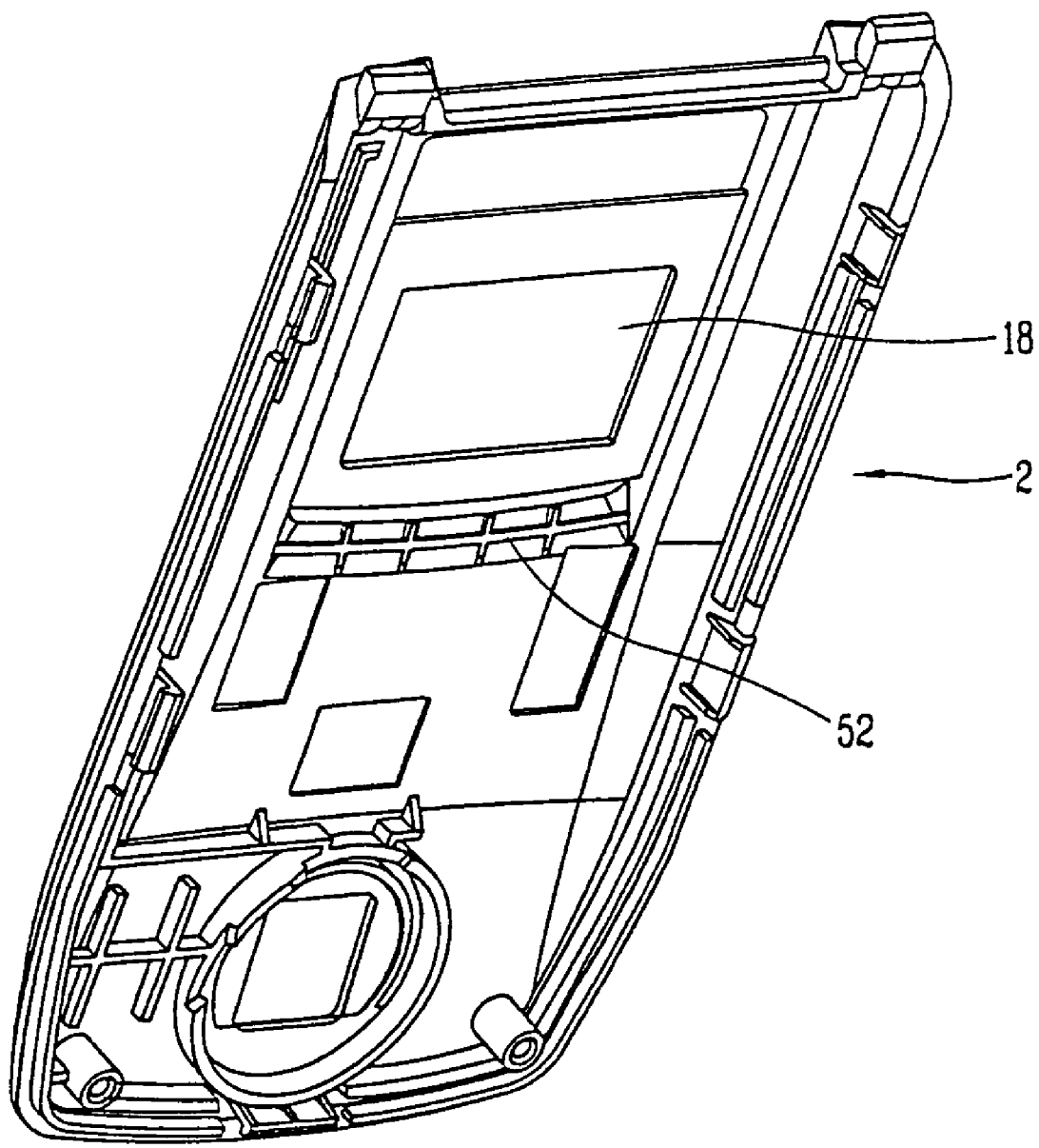
FIG. 10 is a schematic perspective view of an upper cover of a folder in accordance with embodiment of the invention.
Figure 11:
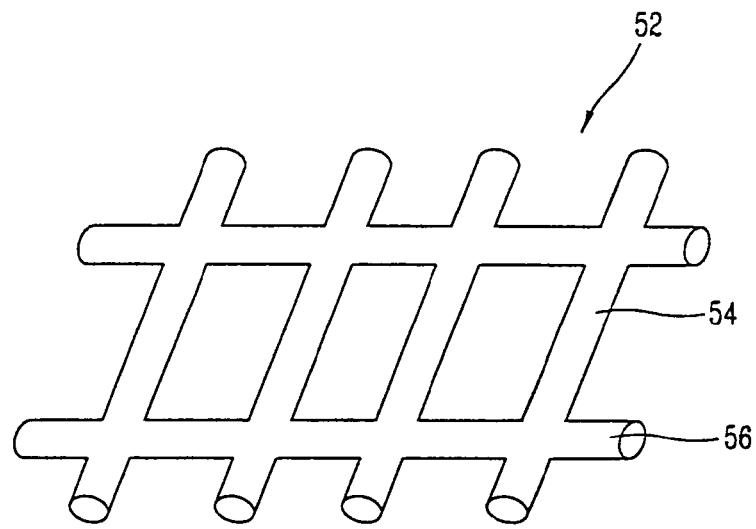
FIG. 11 is a schematic perspective view of a reinforcing member in accordance with embodiment of the invention.

As shown in FIGS. 10 and 11, the reinforcing member 52 is integrally adhered to the inner side of the protrusion portion 22, and is preferably formed of a metal material. The reinforcing member 52 may include one or more first cylindrical members 54, and one or more second cylindrical members 56. In this embodiment, the first and second cylindrical members 54 and 56, respectively, intersect and are disposed at constant intervals in a longitudinal direction of the protrusion portion 22. The reinforcing member 52 may be adhered to the inner side of the protrusion portion 22 when the upper cover 2 is molded, or may be integrally fabricated when the upper cover 2 is injection-molded.

Figure 12:
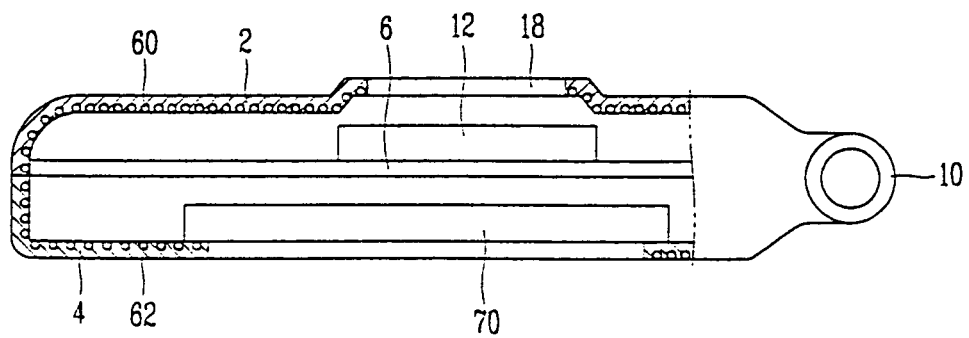
FIG. 12 is a schematic sectional view of a folder of a folder type mobile terminal in accordance with an embodiment of the invention.

A folder of a mobile terminal according to another embodiment of the invention is shown in FIG. 12. The folder of FIG. 12 is configured to be rotatably attached to a main body of a folder type mobile terminal, such as main body 20 of FIG. 1.

The folder shown in FIG. 12 includes a reinforcing member, similar to the reinforcing member 52 discussed above, integrally adhered to the upper cover 2 and the lower cover 4. That is, the upper cover 2 is reinforced by a reinforcing member 60 integrally adhered to the entire upper cover 2 when the upper cover 2 is fabricated. Also, strength of the lower cover 4 is reinforced by a reinforcing member 62 integrally adhered to the entire lower cover 4 when the lower cover 4 is fabricated. Thus, the strength of the upper cover 2 and the lower cover 4 of the folder type mobile terminal may be reinforced by providing reinforcing members 52, 60, and 62. In this manner, deformation of the upper and lower covers due to the impact of an externally applied force is prevented, thus preventing damage to the display module 6.

A folder for a folder type mobile terminal according to embodiments of the invention has at least the following advantages.

A folder for a folder type mobile terminal according to embodiments of the invention is capable of preventing a display module from being damaged due to an external impact, which causes deformation of an upper cover, by installing a buffering member between the upper cover and the display module.

A folder for a folder type mobile terminal according to embodiments of the invention is also capable of preventing a display module from being damaged by strengthening an upper cover and thus preventing the upper cover from being deformed.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal having a housing for a display module, comprising:
   an upper cover;
   a lower cover configured to be attached to the upper cover;
   a display module disposed between the upper cover and the lower cover, the display module comprising at least a sub display and a main display;
   a buffering member disposed between at least a portion of the upper cover and the sub display and configured to prevent an external force applied to the upper cover from being transmitted to the display module; and
   a rib formed at an opening portion of the upper cover, wherein the buffering member comprises a first buffering member disposed between an inner surface of the upper cover and an upper surface of the sub display, and a second buffering member disposed between the inner surface of the upper cover and at least one of a side surface or the upper surface of the sub display, wherein a lower surface of the second buffering member contacts an upper surface of the sub-display module.

2. The mobile terminal of claim 1, wherein the buffering member comprises a resin material having a predetermined elasticity.

3. The mobile terminal of claim 1, wherein the buffering member comprises a rubber material having a constant elasticity.

4. The mobile terminal of claim 1, wherein the buffering member is adhered to either the rib or to the sub display.

5. The mobile terminal of claim 1, wherein the upper cover comprises a protrusion portion which extends upward from a circumferential surface of an opening portion of the upper cover.

6. The mobile terminal of claim 5, wherein the first buffering member is configured to absorb an impact generated by a vertically applied force on the protrusion portion.

7. The mobile terminal of claim 6, wherein the second buffering member is configured to absorb an impact generated by a substantially laterally applied force on the protrusion portion.

8. The mobile terminal of claim 7, wherein the first buffering member comprises a resin material having a constant elasticity.

9. The mobile terminal of claim 7, wherein the second buffering member comprises a resin material having a constant elasticity.

10. The mobile terminal of claim 5, further comprising a first reinforcing member disposed at an inner surface of the protrusion portion of the upper cover and configured to reinforce a strength of the protrusion portion of the upper cover.

11. The mobile terminal of claim 10, further comprising a second reinforcing member disposed at an inner surface of the lower cover and configured to reinforce a strength of the lower cover.

12. The mobile terminal of claim 1, wherein the lower cover is configured to be rotatably connected to a main body of the mobile terminal.

13. The mobile terminal of claim 1, wherein the second buffering member contacts the first buffering member.

14. The mobile terminal of claim 13, wherein a side surface of the second buffering member contacts a side surface of the first buffering member.

15. The mobile terminal of claim 13, wherein a side surface of the second buffering member contacts the sub-display module.

16. The mobile terminal of claim 13, wherein the first buffering contacts an inner surface of the rib.

17. A mobile terminal having a housing for a display module, comprising:
an upper cover;
a lower cover configured to be attached to the upper cover;
a display module disposed between the upper cover and the lower cover, the display module comprising at least a sub display and a main display; and
a buffering member disposed between at least a portion of the upper cover and the sub display and configured to prevent an external force applied to the upper cover from being transmitted to the display module, and wherein the buffering member comprises a first buffering member disposed between an inner surface of the upper cover and an upper surface of the sub display, and a second buffering member disposed between the inner surface of the upper cover and at least one of a side surface or the upper surface of the sub display, the first buffering includes a plurality of holes and a lower surface of the second buffering member contacts an upper surface of the sub-display.

18. The mobile terminal of claim 17, wherein each vent hole comprises a groove of substantially constant width which is configured to connect an inner surface and an outer surface of the buffering member.

19. The mobile terminal of claim 17, wherein the second buffering member contacts the first buffering member.

20. The mobile terminal of claim 19, wherein a side surface of the second buffering member contacts a side surface of the first buffering member.

21. The mobile terminal of claim 19, wherein a side surface of the second buffering member contacts the sub-display module.

22. The mobile terminal of claim 19, wherein the first buffering contacts an inner surface of the rib.

23. The mobile terminal of claims 17, wherein the plurality of holes are vent holes.

24. A mobile terminal having a housing for a display module, comprising:
an upper cover;
a lower cover configured to be attached to the upper cover;
a display module disposed between the upper cover and the lower cover, the display module comprising at least a sub display and a main display;
a buffering member disposed between at least a portion of the upper cover and the sub display and configured to prevent an external force applied to the upper cover from being transmitted to the display module, wherein the upper cover comprises a protrusion portion which extends upward from a circumferential surface of an opening portion of the upper cover; and
a first reinforcing member disposed at an inner surface of the protrusion portion of the upper cover and configured to reinforce a strength of the protrusion portion of the upper cover, wherein the first reinforcing member is integrally adhered to the upper cover at the time of fabrication of said upper cover.

25. A mobile terminal having a housing for a display module, comprising:
an upper cover;
a lower cover configured to be attached to the upper cover;
a display module disposed between the upper cover and the lower cover, the display module comprising at least a sub display and a main display;
a buffering member disposed between at least a portion of the upper cover and the sub display and configured to prevent an external force applied to the upper cover from being transmitted to the display module, wherein the upper cover comprises a protrusion portion which extends upward from a circumferential surface of an opening portion of the upper cover; and
a first reinforcing member disposed at an inner surface of the protrusion portion of the upper cover and configured to reinforce a strength of the protrusion portion of the upper cover, wherein the first reinforcing member comprises a plurality of cylindrical members configured to intersect at predetermined points.

26. A mobile terminal having a housing for a display module, comprising:
an upper cover;
a lower cover configured to be attached to the upper cover;
a display module disposed between the upper cover and the lower cover, the display module comprising at least a sub display and a main display;
a buffering member disposed between at least a portion of the upper cover and the sub display and configured to prevent an external force applied to the upper cover from being transmitted to the display module, wherein the upper cover comprises a protrusion portion which extends upward from a circumferential surface of an opening portion of the upper cover;
a first reinforcing member disposed at an inner surface of the protrusion portion of the upper cover and configured to reinforce a strength of the protrusion portion of the upper cover; and
a second reinforcing member disposed at an inner surface of the lower cover and configured to reinforce a strength of the lower cover, wherein the second reinforcing member is integrally adhered to the lower cover at the time of fabrication of said lower cover.

27. A mobile terminal, comprising:
a main body; and
a housing configured to be rotatably attached to the main body, the housing comprising:
an upper cover;
a lower cover configured to be attached to the upper cover;
a display module disposed between the upper cover and the lower cover, the display module comprising at least a sub display and a main display;
a buffering member disposed between at least a portion of the upper cover and the sub display and configured to prevent an external force applied to the upper cover from being transmitted to the display module, wherein an upper surface of the upper cover includes a protrusion portion that extends from a substantially flat portion up to an opening portion of the upper cover; and
a rib formed at an opening portion of the upper cover, wherein the buffering member is disposed between a lower surface of the rib and an upper surface of the sub display, wherein the buffering member comprises a first buffering member and a second buffering member and a lower surface of the second buffering member contacts and upper surface of the sub-display module.

28. The mobile terminal of claim 27, wherein the second buffering member contacts the first buffering member.

29. The mobile terminal of claim 28, wherein a side surface of the second buffering member contacts a side surface of the first buffering member.

30. The mobile terminal of claim 28, wherein a side surface of the second buffering member contacts the sub-display module.

31. The mobile terminal of claim 28, wherein the first buffering contacts an inner surface of the rib.

32. A mobile terminal, comprising:
a main body;
a housing configured to be rotatably attached to the main body, the housing comprising:
an upper cover having a sub window on opening portion and a rib in which the sub window is mounted formed at an edge of a lower surface of the opening portion;
a lower cover configured to be attached to the upper cover;
a display module disposed between the upper cover and the lower cover, the display module comprising at least a sub display and a main display; and
a buffering member disposed on a surface of the sub display and configured to prevent force applied to the upper cover from being transmitted to the display module, wherein the buffering member is formed to have a rectangle opening portion and wherein the buffering member comprises a first buffering member disposed between an inner surface of the upper cover and an upper surface of the sub display, and a second buffering member disposed between the inner surface of the upper cover and at least one of a side surface or the upper surface of the sub display, wherein a lower surface of the second buffering member contacts an upper surface of the sub-display.

33. The mobile terminal of claim 32, wherein the rectangle opening portion is substantially the same size as the display portion of the sub display.

34. The mobile terminal of claim 32, wherein the second buffering member contacts the first buffering member.

35. The mobile terminal of claim 34, wherein a side surface of the second buffering member contacts a side surface of the first buffering member.

36. The mobile terminal of claim 34, wherein a side surface of the second buffering member contacts the sub-display module.

37. The mobile terminal of claim 34, wherein the first buffering contacts an inner surface of the rib.

* * * * *